United States Patent [19]

Hoefer

[11] Patent Number: 5,374,106
[45] Date of Patent: Dec. 20, 1994

[54] FOLDING AUXILIARY SEAT FOR TRACTOR CAB

[75] Inventor: Wayne A. Hoefer, Mayview, Mo.

[73] Assignee: Agco Corporation, Coldwater, Ohio

[21] Appl. No.: 129,364

[22] Filed: Sep. 30, 1993

[51] Int. Cl.$^5$ ............................................. B60N 2/38
[52] U.S. Cl. .................................. 297/236; 297/15;
297/311; 297/337; 297/411.22; 108/47;
296/65.1
[58] Field of Search ................. 297/14, 15, 107, 236,
297/237, 337, 342, 411.22, 311; 108/46–48, 86;
296/65.1

[56] References Cited

U.S. PATENT DOCUMENTS

| 427,856 | 5/1890 | Goodrich | 297/311 X |
| 574,310 | 12/1896 | Edwards | 297/15 X |
| 1,518,099 | 12/1924 | Neiswender | 108/47 |
| 2,565,695 | 8/1951 | Lynn | 297/411.22 X |
| 4,076,302 | 2/1978 | Sable | 296/65.1 |
| 4,527,828 | 7/1985 | Groce et al. | |
| 5,120,187 | 6/1992 | Weber | |

FOREIGN PATENT DOCUMENTS 1345045 10/1963 France ........................... 108/48
420733 8/1984 U.S.S.R. .

Primary Examiner—Peter R. Brown
Attorney, Agent, or Firm—Litman, McMahon & Brown

[57] ABSTRACT

A folding auxiliary seat assembly for a tractor cab includes a brace plate pivotally connected to interior structure of the cab, a main cushion hingedly connected to the brace plate, and an outer cushion hingedly connected to the main cushion. A latch pawl extending from the brace plate cooperates with a spring latch on a side wall of the interior structure to latch the assembly in a retracted position. In the retracted position, the outer cushion is folded beneath the main cushion, and the brace plate is pivoted to a vertical position. The main cushion has retainer sockets formed on an under side thereof which are positioned to receive retainer pins mounted on a top wall of the interior structure when the seat assembly is in a deployed position. In the deployed position, the outer cushion is folded out to a coplanar relationship with the main cushion, and the brace plate is angled away from the side wall of the supporting interior structure.

18 Claims, 2 Drawing Sheets

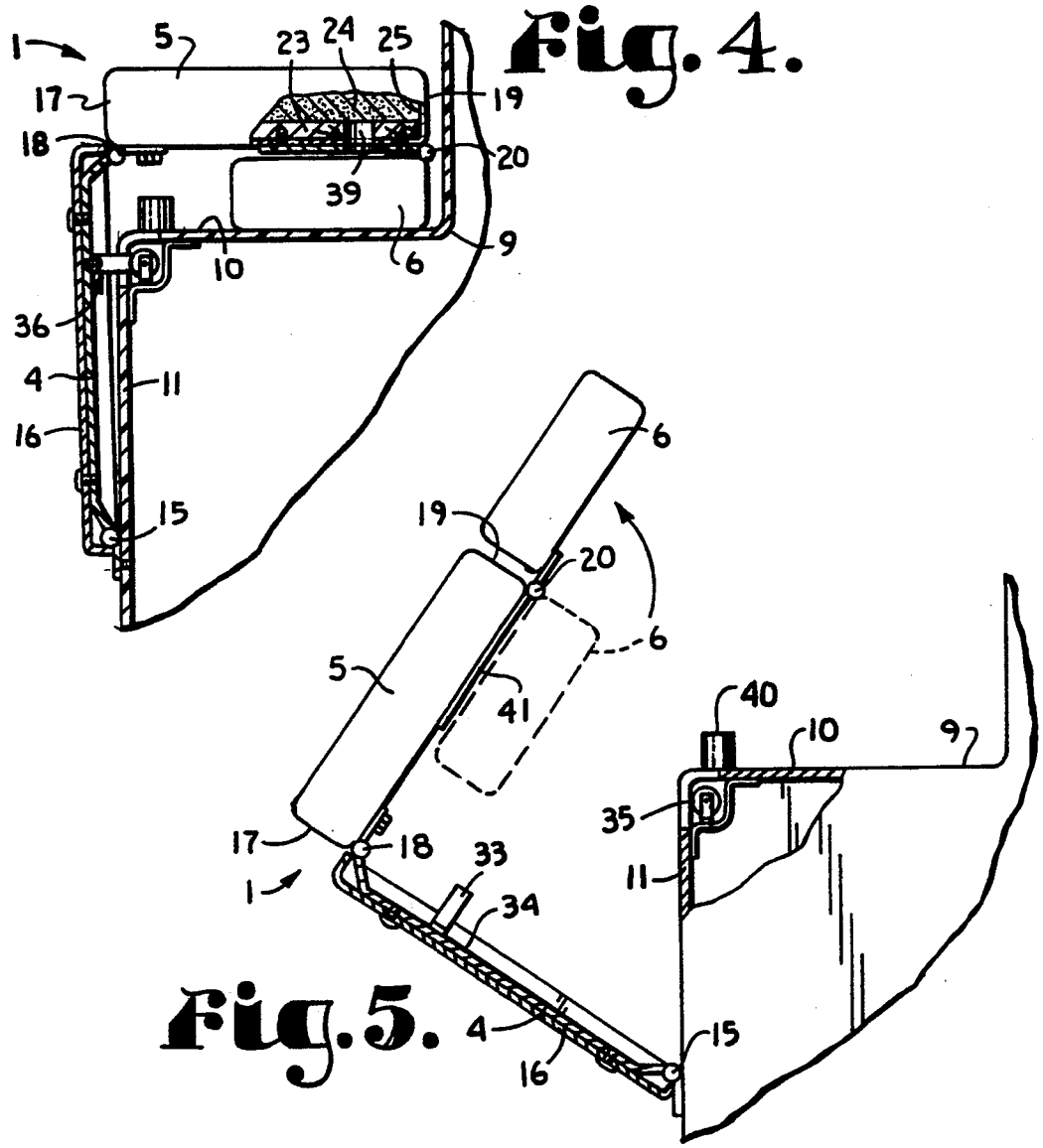
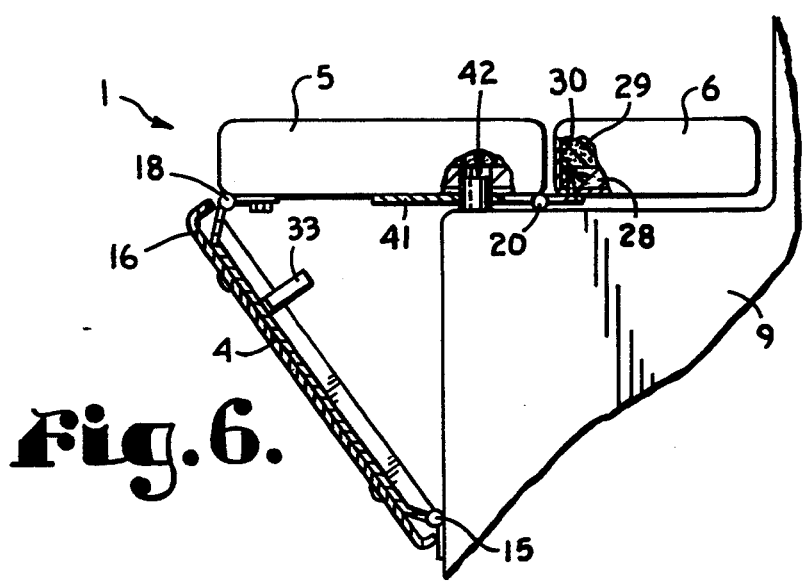

FOLDING AUXILIARY SEAT FOR TRACTOR CAB

BACKGROUND OF THE INVENTION

The present invention relates to vehicle seating and, more particularly, to a folding auxiliary seat for an enclosed tractor cab.

Modern agricultural tractors are often provided with enclosed cabs to reduce solar exposure to the driver, to allow air conditioning which reduces driver fatigue, and to protect the driver, to some degree, from air borne pollutants such as dust and agricultural chemicals. Although such tractors are generally designed as single occupant vehicles with a seat for the driver only, it is sometimes desirable for a passenger to ride in the cab of a tractor. For example, it is often desirable for an instructor to ride along with a first time driver of a particular type of tractor or with a driver learning to operate a particular type of soil working equipment. Additionally, it might be convenient for an assistant or a mechanic to ride along with a tractor operator to or from a field being cultivated or during passes over the field.

Conventionally, an extra rider in a tractor cab has no seat provided. Thus, the rider must assume a crouched position, leaning against the interior of the cab, such as a wheel well, in such a manner as to avoid interfering with the driver or blocking his view. Such a position is usually uncomfortable and unsteady. Since tractors are often driven over rough terrain, such a position can also be hazardous to the rider and to the driver, if the rider should be thrown off balance within the cab.

What is needed is a seating provision which allows a rider in a tractor cab to set in a secure, reasonably comfortable position without interference to the driver and which can be stowed when not needed.

SUMMARY OF THE INVENTION

The present invention provides a retractable auxiliary seat assembly for a tractor cab to safely and conveniently accommodate a rider in the cab. The seat assembly includes a brace plate which is pivotally connected to the interior structure of the cab, a main seat cushion pivotally connected to an outer end of the brace plate, and an outer seat cushion hingedly connected to the main cushion.

In a retracted position of the seat assembly, the outer cushion is folded beneath the main cushion, and the brace is pivoted to a vertical position to rest the main cushion on the outer cushion and the outer cushion on a horizontal seat support surface of the interior structure of the cab. A brace latch on the brace plate engages a catch on the interior structure to retain the seat assembly in the retracted position. In a deployed position, the outer cushion is folded out to a coplanar relationship with the main cushion, and the brace plate is pivoted angularly away from the brace latch to allow the cushion to rest on the horizontal seat support surface. A pair of seat retainer pins upstanding from the support surface engage sockets under the main cushion to retain the cushions and brace in the deployed position. A seat belt is preferably anchored to interior structure near the cushions to safely retain an occupant on the deployed seat assembly.

The auxiliary seat assembly of the present invention, thus, can be deployed to provide a safe and steady seat for an occasional rider in the tractor cab and can be retracted out of the way of the driver when no rider is to be carried.

OBJECTS AND ADVANTAGES OF THE INVENTION

The principal objects of the present invention are: to provide an auxiliary seat for a tractor cab to safely accommodate an occasional rider within such a tractor cab; to provide such a seat which folds out of the way of the driver when not in use; to provide such a seat which includes a brace plate pivotally connected to interior structure of the cab, a main cushion pivotally connected to the brace plate, and an outer cushion pivotally connected to the main cushion, the outer cushion being folded under the main cushion for folding the auxiliary seat out of the way when not in use; to provide such a seat in which the assembly is positively retained in a retracted position as well as in a deployed position; to provide such a folding seat in combination with a seat belt to securely position an occupant in the seat; to provide such a seat which can be retrofitted into some types of existing tractor cabs; to provide such a folding seat which can be adapted for use on open types of tractors without enclosed cabs, as well as in other types of vehicles, such as truck cabs, boats, limousines, and the like; and to provide such a folding auxiliary seat for tractor cabs which is economical to manufacture, which is convenient in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 4 is a fragmentary cross sectional view of the folding auxiliary seat, taken on line 4—4 of FIG. 2 with the seat in the retracted condition, with a portion broken away to illustrate internal details of the main cushion.

FIG. 5 is a side elevational view of the folding auxiliary seat shown in a position intermediate the retracted position and the extended position, with a portion broken away to illustrate a brace plate latch.

FIG. 6 is a side elevational view taken on line 6—6 of FIG. 3 and illustrates the folding auxiliary seat in the deployed position, with portions broken away to illustrate details of a main cushion retainer.

DETAILED DESCRIPTION OF THE INVENTION

Figure 1:
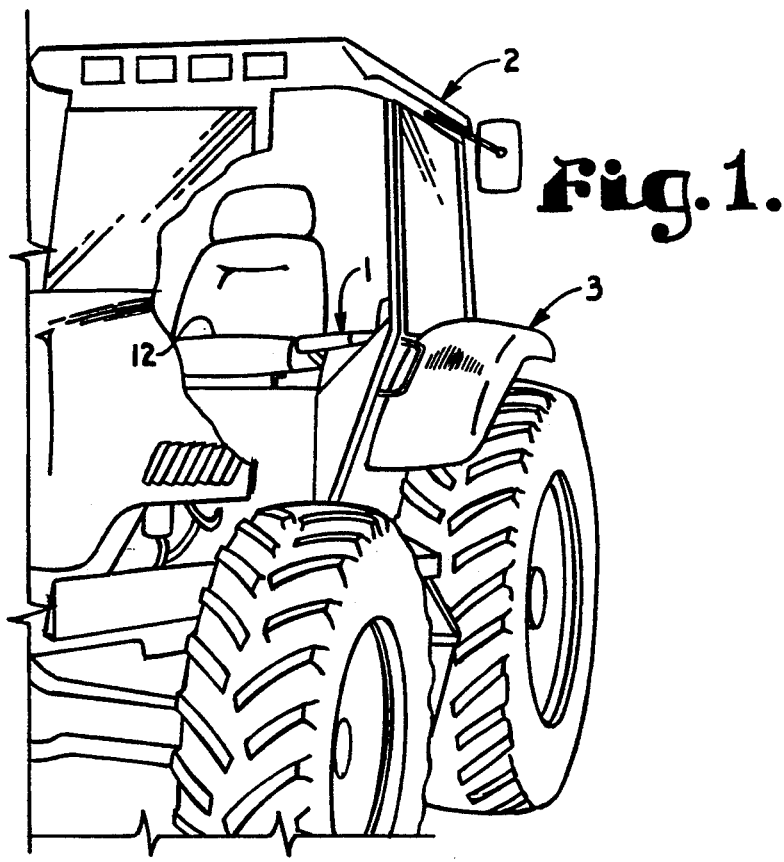
FIG. 1 is a fragmentary perspective view of a tractor having a folding auxiliary seat embodying the present invention installed in a cab thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
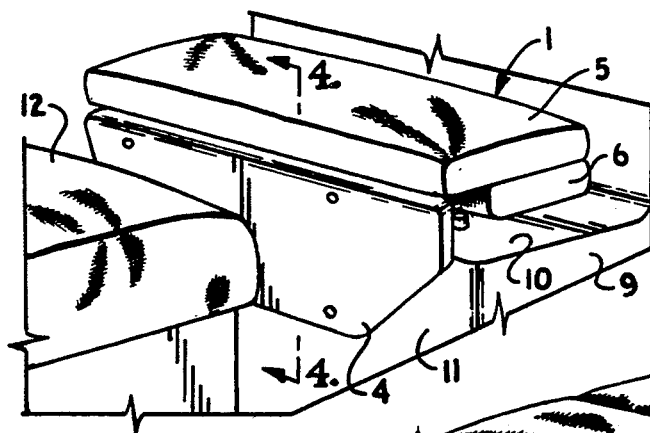
FIG. 2 is an enlarged fragmentary perspective view of the folding auxiliary seat shown in a retracted condition within the tractor cab.

Referring to the drawings in more detail:

The reference numeral 1 generally designates a folding auxiliary seat assembly which embodies the present invention. The assembly 1 is positioned within the enclosed cab 2 of a tractor 3 to provide seating for a rider within the cab 2 other than the driver of the tractor 3. The assembly 1 generally includes a brace plate 4, a main cushion 5, and an outer cushion 6 which are pivotally interconnected in such a manner as to enable the seat assembly 1 to be extended to a deployed position (FIGS. 3 and 6) to seat an occasional rider within the cab 2 or folded to a retracted position (FIGS. 2 and 4) when not needed.

The tractor 3 and cab 2 are conventional, and the cab 2 includes interior structure 9 which supports the seat assembly 1. The interior structure 9 may, for example, be interior portions of a wheel well, or the like. The illustrated structure 9 includes a horizontally oriented top wall 10 and a vertically oriented side wall 11 which faces, and is spaced from, a driver's seat 12 of the tractor 3. The walls 10 and 11 may be supported by additional framework (not shown) of the cab 2.

The brace plate 4 is pivotally connected to the side wall 11, as by a hinge or axially aligned hinges 15. An outer brace cover 16, as of plastic, covers the illustrated brace plate 4. The main cushion 5 has an inner side 17 pivotally connected to the brace plate by a hinge member 18. The outer cushion 6 is pivotally connected to an outer side 19 of the main cushion by a hinge member 20. The hinge members 18 and 20 may be in the form of so-called piano hinges and, along with the hinge 15, are oriented to pivot about pivot axes parallel to a longitudinal axis of the tractor 3.

The main cushion 5 is formed by a base plate 23, a main cushion pad 24, and a main cushion cover 25 (FIG. 4). Similarly, the outer cushion 6 is formed by a base plate 28, a pad 29, and a cover 30 (FIG. 6). The base plates 23 and 28 may be formed of plywood, pressed fiberboard, or the like. The hinge 18 is connected between the brace plate 4 and the base plate 23 of the main cushion 5. The hinge 20 is connected between the base plate 23 of the main cushion 5 and the base plate 28 of the outer cushion 6.

The seat assembly 1 is positively retained in the retracted position, as well as in the deployed position. The brace plate 4 has a latch pawl 33 extending from an inner surface 34 thereof which is positioned to engage a spring latch 35 mounted on the interior structure 9 to retain the assembly 1 in the retracted position. The pawl 33 and latch 35 cooperate to form a brace latch mechanism 36. The illustrated spring latch 35 is mounted near an intersection of the top and side walls 10 and 11 of the interior structure 9. The latch 35 resiliently receives the pawl 33 as the brace plate 4 is pivoted toward the side wall 11, when the assembly 1 is moved toward the retracted position, shown in FIG. 4. Pivoting the brace plate 4 away from the side wall 11, to place the assembly 1 in the deployed position, snaps the pawl 33 out of engagement with the spring latch 35.

The main cushion 5 has a retainer socket 39 formed into a lower side thereof which is positioned to receive a retainer pin 40 mounted on the top wall 10 of the cab interior structure 9. The socket 39 is formed by aligned bores through the cushion cover 25 and base plate 23 of the main cushion 5. The main cushion 5 may also be provided with a retainer plate 41, which has a bore aligned with the bores in the cover 25 and base plate 23, to reinforce the cushion 5 in the area of the socket 39. The illustrated retainer pin 40 is cylindrical, but could alternatively have a different cross-sectional shape. The retainer socket 39 and retainer pin 40 cooperate to form a retainer mechanism 42 which retains the seat assembly 1 in the deployed position and, functionally, prevents the cushions 5 and 6 from sliding in a lateral direction. Preferably, the seat assembly 1 includes a pair of the retainer mechanisms 42 which are spaced in a direction parallel to the axes of the hinges 18 and 20. The retainer pins 40 receive the sockets 39 thereover when the seat assembly 1 is moved toward the deployed position. When the assembly 1 is to be retracted, the cushions 5 and 6 are initially lifted which releases the sockets 39 from the pins 40.

Figure 3:
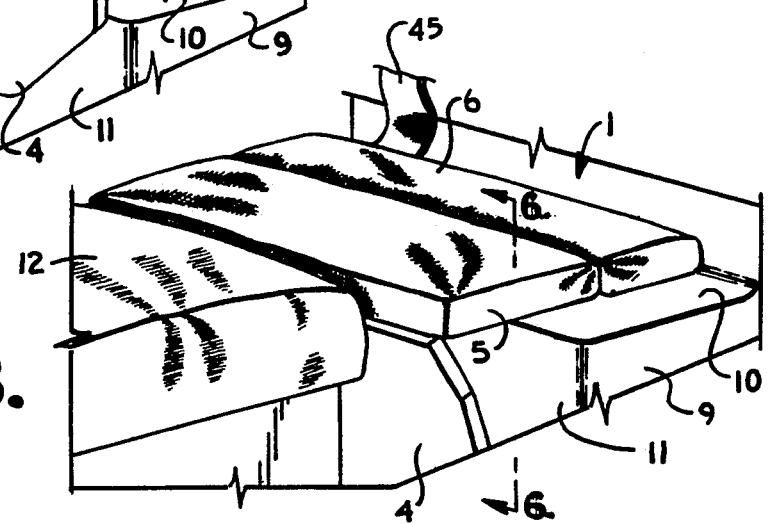
FIG. 3 is a similar to FIG. 2 and illustrates the folding auxiliary seat in an extended or deployed position.

The distance between the hinges 15 and 18 is such that, with the brace plate 4 in a vertical retracted position, the outer cushion 6 is pivoted 180 degrees about the hinge 20 and positioned beneath the main cushion 5 to rest on the top wall 10 of the interior structure 9. In the deployed position of the assembly 1, the outer cushion 6 and a portion of the main cushion 5 rest on the top wall 10 when the sockets 39 are fully engaged with the retainer pins 40. The seat assembly 1 is preferably used in conjunction with a seat belt 45, which is secured to the interior structure 9 of the cab 2, to positively position an occupant on the assembly 1. One strap of such a seat belt 45 is shown in FIG. 3.

While the folding seat assembly 1 has been described particularly for use in a tractor cab 2, its use is not intended to be restricted only to tractor cabs. The folding seat assembly 1 can also be advantageously used in other types of agricultural vehicles, extended cab pickup trucks, aircraft, boats, limousines, and the like.

It is to be understood that while certain forms of the present invention have been illustrated and described herein, it is not to be limited to the specific forms or arrangement of parts described and shown.

What is claimed and desired to be secured by Letters Patent is as follows:

1. A folding seat assembly movably mounted on a seat support means including a vertical surface and a horizontal surface, said assembly comprising:
  (a) a brace member having a lower end pivotally connected to said vertical surface of said seat support means and having an upper end;
  (b) seat cushion means pivotally connected to said upper end of said brace member;
  (c) said brace member being pivoted to a position adjacent said vertical surface of said seat support means in a retracted position of said assembly; and
  (d) said brace member being pivoted angularly outward from said seat support means whereby said cushion means is supported by said brace member and said horizontal surface of said seat support means in a deployed position of said assembly.

2. An assembly as set forth in claim 1 and including:
  (a) retainer means positioned respectively on said cushion means and said seat support means and releasably engaged therebetween in said deployed position to thereby retain said brace member and cushion means in said deployed position.

3. An assembly as set forth in claim 1 and including:

(a) seat belt means connected to said seat support means at a location to retain an occupant on said cushion means in said deployed position.

4. A folding seat assembly movably mounted on a seat support means including a vertical surface and a horizontal surface, said assembly comprising:
   (a) a brace member having a lower end pivotally connected to said vertical surface of said seat support means and having an upper end;
   (b) a first cushion member pivotally connected to said upper end of said brace member;
   (c) a second cushion member hingedly connected to said first cushion member;
   (d) in a retracted position of said assembly, said second cushion member being pivoted to a position beneath said first cushion member and said brace member being pivoted to a position adjacent said vertical surface of said seat support means; and
   (e) in a deployed position of said assembly, said second cushion member being pivoted to a substantially coplanar relationship with said first cushion member and said brace member being pivoted outwardly from said seat support means, whereby said first cushion member is supported by said brace member and said horizontal surface of said seat support means and said second cushion member is supported by said horizontal surface of said seat support means.

5. An assembly as set forth in claim 4 and including:
   (a) retainer means positioned respectively on said seat cushion means and said horizontal surface of said seat support means and releasably engaged therebetween in said deployed position to thereby retain said brace member and the first and second cushion members in said deployed position.

6. An assembly as set forth in claim 5 wherein said retainer means includes:
   (a) a seat retainer pin upstanding from said horizontal surface of said seat support means; and
   (b) socket means positioned on said second cushion member to receive said pin in said deployed position.

7. An assembly as set forth in claim 4 and including:
   (a) brace latch means mounted on at least one of said brace member and said vertical surface of said seat support means and releasably engaged therebetween in said retracted position to releasably retain said brace member and the first and second cushion members in said retracted position.

8. An assembly as set forth in claim 4 and including:
   (a) seat belt means connected to said seat support means at a location to retain an occupant on said first and second cushion members in said deployed position.

9. An assembly as set forth in claim 4 wherein:
   (a) said first and second cushion members having such thicknesses and said brace member having such a length that, in said retracted position, said brace member is positioned substantially vertically, said second cushion member overlies at least a portion of said horizontal surface of said seat support means, and said first cushion overlies said second cushion member.

10. A folding seat assembly movably mounted on a seat support means including a vertical surface and a horizontal surface, said assembly comprising:
    (a) a brace member having a lower end pivotally connected to said vertical surface of said seat support means and having an upper end;
    (b) a first cushion member pivotally connected to said upper end of said brace member;
    (c) a second cushion member hingedly connected to said first cushion member;
    (d) in a retracted position of said assembly, said second cushion member being pivoted to a position beneath said first cushion member and said brace member being pivoted to a position adjacent said vertical surface of said seat support means;
    (e) in a deployed position of said assembly, said second cushion member being pivoted to a substantially coplanar relationship with said first cushion member and said brace member being pivoted outwardly from said seat support means, whereby said first cushion member is supported by said brace member and said horizontal surface of said seat support means and said second cushion member is supported by said horizontal surface of said seat support means;
    (f) retainer means positioned respectively on said seat cushion means and said horizontal surface of said seat support means and releasably engaged therebetween in said deployed position to thereby retain said brace member and the first and second cushion members in said deployed position; and
    (g) brace latch means mounted on at least one of said brace member and said vertical surface of said seat support means and releasably engaged therebetween in said retracted position to releasably retain said brace member and the first and second cushion members in said retracted position.

11. An assembly as set forth in claim 10 wherein said retainer means includes:
    (a) a seat retainer pin upstanding from said horizontal surface of said seat support means; and
    (b) socket means positioned on said second cushion member to receive said pin in said deployed position.

12. An assembly as set forth in claim 10 and including:
    (a) seat belt means connected to said seat support means at a location to retain an occupant on said first and second cushion members in said deployed position.

13. An assembly as set forth in claim 10 wherein:
    (a) said first and second cushion members having such thicknesses and said brace member having such a length that, in said retracted position, said brace member is positioned substantially vertically, said second cushion member overlies at least a portion of said horizontal surface of said seat support means, and said first cushion overlies said second cushion member.

14. An assembly as set forth in claim 10 wherein said seat support means includes a horizontal support member with a vertical support member depending therefrom, and wherein:
    (a) said brace member is connected to said vertical member at a position which is spaced from said horizontal support member;
    (b) said brace member has a length whereby said second cushion member and at least a portion of said first member rest on said horizontal support member in said deployed position; and
    (c) said brace member has such a length and said first and second cushion members have such thicknesses that, in said retracted position, said second cushion member rests on said horizontal support member and said first cushion member rests on said second cushion member.

15. A folding seat assembly movably mounted on a seat support means including a vertical surface and a horizontal surface, said assembly comprising:
    (a) a brace member having a lower end pivotally connected to said vertical surface of said seat support means and having an upper end;
    (b) seat cushion means pivotally connected to said upper end of said brace member;
    (c) said brace member being pivoted to a position adjacent said vertical surface of said seat support means in a retracted position of said assembly;
    (d) said brace member being pivoted angularly outward from said seat support means whereby said cushion means is supported by said brace member and said horizontal surface of said seat support means in a deployed position of said assembly; and
    (e) retainer means positioned respectively on said cushion means and said seat support means and releasably engaged therebetween in said deployed position to thereby retain said brace member and cushion means in said deployed position, said retainer means including:
        (1) a seat retainer pin upstanding from said horizontal surface of said seat support means; and
        (2) socket means positioned on said cushion means to receive said pin in said deployed position.

16. A folding seat assembly movably mounted on a seat support means including a vertical surface and a horizontal surface, said assembly comprising:
    (a) a brace member having a lower end pivotally connected to said vertical surface of said seat support means and having an upper end;
    (b) seat cushion means pivotally connected to said upper end of said brace member;
    (c) said brace member being pivoted to a position adjacent said vertical surface of said seat support means in a retracted position of said assembly;
    (d) said brace member being pivoted angularly outward from said seat support means whereby said cushion means is supported by said brace member and said horizontal surface of said seat support means in a deployed position of said assembly; and
    (e) brace latch means mounted on at least one of said brace member and said seat support means and releasably engaged therebetween in said retracted position to releasably retain said brace member and said cushion means in said retracted position.

17. A folding seat assembly movably mounted on a seat support means including a vertical surface and a horizontal surface, said assembly comprising:
    (a) a brace member having a lower end pivotally connected to said vertical surface of said seat support means and having an upper end;
    (b) seat cushion means pivotally connected to said upper end of said brace member;
    (c) said brace member being pivoted to a position adjacent said vertical surface of said seat support means in a retracted position of said assembly;
    (d) said brace member being pivoted angularly outward from said seat support means whereby said cushion means is supported by said brace member and said horizontal surface of said seat support means in a deployed position of said assembly;
    (e) said cushion means including a first cushion member pivotally connected to said upper end of said brace member and a second cushion member hingedly connected to said first cushion member;
    (f) said second cushion member being pivoted to a substantially coplanar relationship with said first cushion member in said deployed position; and
    (g) said second cushion member being pivoted beneath said first cushion member in said retracted position.

18. An assembly as set forth in claim 17 wherein:
    (a) said first and second cushion members have such thicknesses and said brace member has such a length that, in said retracted position, said brace member is positioned substantially vertically, said second cushion member overlies at least a portion of said horizontal surface of said seat support means, and said first cushion overlies said second cushion member.

* * * * *